(12) United States Patent
Takata et al.

(10) Patent No.: US 8,505,905 B2
(45) Date of Patent: Aug. 13, 2013

(54) SHEET FEEDING DEVICE, AUTOMATIC SHEET TRANSFER DEVICE AND IMAGE FORMING DEVICE

(75) Inventors: Motoki Takata, Toyohashi (JP); Keiko Toyoda, Toyokawa (JP); Masahiro Nonoyama, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 224 days.

(21) Appl. No.: 13/177,369

(22) Filed: Jul. 6, 2011

(65) Prior Publication Data

US 2012/0008997 A1    Jan. 12, 2012

(30) Foreign Application Priority Data

Jul. 8, 2010 (JP) ................................. 2010-156266

(51) Int. Cl.
*B65H 3/06*      (2006.01)
(52) U.S. Cl.
USPC .......................................... 271/117; 271/118
(58) Field of Classification Search
USPC ................................................. 271/117, 118
See application file for complete search history.

(56) References Cited

U.S. PATENT DOCUMENTS

| | | | |
|---|---|---|---|
| 5,085,420 A * | 2/1992 | Sata | 271/114 |
| 5,547,181 A * | 8/1996 | Underwood | 271/114 |
| 6,390,463 B1 | 5/2002 | Iwago | |
| 7,828,282 B2 * | 11/2010 | Zhang | 271/110 |
| 2008/0277864 A1 * | 11/2008 | Liu et al. | 271/117 |
| 2010/0096800 A1 * | 4/2010 | Funada | 271/114 |
| 2011/0204560 A1 * | 8/2011 | Uehara | 271/117 |

FOREIGN PATENT DOCUMENTS

| | | |
|---|---|---|
| EP | 1 215 536 A1 | 6/2002 |
| JP | 2002-249246 A | 9/2002 |
| JP | 4051832 | 2/2008 |

\* cited by examiner

*Primary Examiner* — David H Bollinger
(74) *Attorney, Agent, or Firm* — Buchanan Ingersoll & Rooney PC

(57) ABSTRACT

A sheet feeding device comprising a supply roller for feeding sheets mounted on a tray, a drive shaft for supporting the supply roller and rotationally driving the same, first and second supporting arms swingably supported on the drive shaft, a feed roller rotatably supported on the first and second supporting arms, a feed roller transmission mechanism for rotating the feed roller in conjunction with the rotation of the supply roller, first and second transmission mechanisms for swinging the first and second supporting arms, and first and second resilient retaining members which are capable of retaining the first and second supporting arms, the first and second transmission mechanisms shifting the timings that the respective first and second supporting arms are swung against the corresponding resilient retaining members.

An automatic sheet transfer device comprising this sheet feeding device. An electrophotographic image forming device comprising this automatic sheet transfer device.

12 Claims, 3 Drawing Sheets

SHEET FEEDING DEVICE, AUTOMATIC SHEET TRANSFER DEVICE AND IMAGE FORMING DEVICE

CROSS-REFERENCE TO RELATED APPLICATION

This invention is based on Japanese Patent Application No. 2010-156266 filed in Japan on Jul. 8, 2010, the entire content of which is hereby incorporated by reference.

BACKGROUND OF THE INVENTION

1. Field of the Invention

The present invention relates to a sheet feeding device which can be used in an automatic original document transfer device which feeds and transfers a sheet-like original document to be read in an image reading device to an image reading part thereof and like devices, and an automatic sheet transfer device which can be used as an automatic original document transfer device and like device, and further to an image forming device.

2. Description of Related Art

There are various types of sheet feeding devices employed in an automatic original document transfer device which feeds and transfers a sheet-like original document to be read in an image reading device to an image reading part thereof and like devices, among which there is a device of the following type:

The sheet feeding device comprises a supply roller for feeding sheets loaded on a tray for loading sheets, a drive shaft for supporting the supply roller and rotationally driving the same, a roller supporting member which is swingably supported on the drive shaft, a feed roller which is rotatably supported on the roller supporting member, a feed roller transmission mechanism for rotating the feed roller in conjunction with the rotation of the supply roller, and a roller supporting member transmission mechanism provided on the drive shaft for swinging the roller supporting member by the drive shaft, the feed roller being so constructed that during feeding of the sheet, the roller supporting member is swung by the drive shaft via the roller supporting member transmission mechanism, whereby the feed roller is capable of moving from a retracted position to be in contact with the sheets loaded on the tray to feed the top sheet to the supply roller and during standby, the roller supporting member is swung back by the drive shaft via the roller supporting member transmission mechanism, whereby the feed roller is capable of being retracted to the retracted position.

In this type of sheet feeding device, the drive shaft is rotated by the drive force transmitted from the motor via the electromagnetic clutch, and the drive shaft is often disconnected from the motor when the electromagnetic clutch is turned off. The electromagnetic clutch is often turned off when sheets are not being fed. When the electromagnetic clutch is turned off like this, if no swing limitation mechanism for the roller supporting member is provided, the roller supporting member swings by its own weight under gravity and is lowered so that the feed roller comes into contact with the sheets on the tray. This would adversely affect handling of jam and the like.

As for this point, providing a two-way torque limiter on the paper feed roller shaft (drive shaft) is suggested as a mechanism for retaining the feed roller in the retracted position when drive from the motor to the supply roller and feed roller is removed by the electromagnetic clutch.

Moreover, JP2002-249246A describes a technique of allowing the feed roller to remain in the standby position even if the drive from the motor is removed.

Japanese Patent Publication No. 4051832 describes that a mechanism in which a feed roller is lifted when a cover of an automatic original document transfer device is closed.

However, in the method of employing the two-way torque limiter, the feed roller is retained by the two-way torque limiter, and therefore the torque of the torque limiter is applied to the motor as drive load when the feed roller moves from a sheet feeding position to a retracted position, when moving in the opposite direction and during the sheet feeding operation. This is disadvantageous since the size of the motor needs to be increased and power consumption is increased.

Moreover, in the technique described in JP2002-249246A, a torque limiter is used to retain the feed roller in the standby position, and therefore an extra load due to the torque limiter is applied on the motor during feeding of a sheet, which may cause a step-out of the motor and an increase in power consumption.

In the technique described in Japanese Patent Publication No. 4051832, only the cover is opened and closed when handling jam, and the feed roller is in a state of being lowered on the sheet. Handling jam is therefore uneasy.

SUMMARY OF THE INVENTION

The present invention provides a sheet feeding device comprising:

a supply roller for feeding sheets loaded on a tray for loading sheets, a drive shaft for supporting the supply roller and rotationally driving the same, a first supporting arm which is swingably supported on the drive shaft, a second supporting arm which is swingably supported on the drive shaft, a feed roller which is rotatably supported on the first supporting arm and second supporting arm, a feed roller transmission mechanism for rotating the feed roller in conjunction with rotation of the supply roller, a first transmission mechanism for swinging the first supporting arm, a second transmission mechanism for swinging the second supporting arm, a first resilient retaining member which is capable of retaining the first supporting arm, and a second resilient retaining member which is capable of retaining the second supporting arm, the feed roller being capable of being positioned in a retracted position where the first supporting arm is retained by the first resilient retaining member, and the second supporting arm is retained by the second resilient member, during feeding of the sheet, moving from the retracted position to a feeding position where it comes into contact with the sheets mounted on the tray by swinging of the first supporting arm against the first resilient retaining member by the drive shaft via the first transmission mechanism and by swinging of the second supporting arm against the second resilient retaining member by the drive shaft via the second transmission mechanism, and feeding the sheets to the supply roller with the top sheet first, when retracted, moving from the feeding position to the retracted position by swinging of the first supporting arm against the first resilient retaining member by the drive shaft via the first transmission mechanism and by swinging of the second supporting arm against the second resilient retaining member by the drive shaft via the second transmission mechanism, the first transmission mechanism and the second transmission mechanism shifting the timing that the first supporting arm is swung against the first resilient retaining member and the timing that the second supporting arm is swung against the second resilient retaining member either when the feed roller is moved from the retracted position to the feeding position or when the feed roller is moved from the feeding position to the retracted position.

The present invention also provides an automatic sheet transfer device which transfers sheets automatically and comprises the above sheet feeding device.

The present invention further provides an electrophotographic image forming device comprising the above automatic sheet transfer device.

The foregoing and other objects, features, aspects and advantages of the present invention will become more apparent from the following detailed description of the preferred embodiments of the present invention when taken in conjunction with accompanying drawings.

DESCRIPTION OF THE PREFERRED EMBODIMENTS

Figure 1:
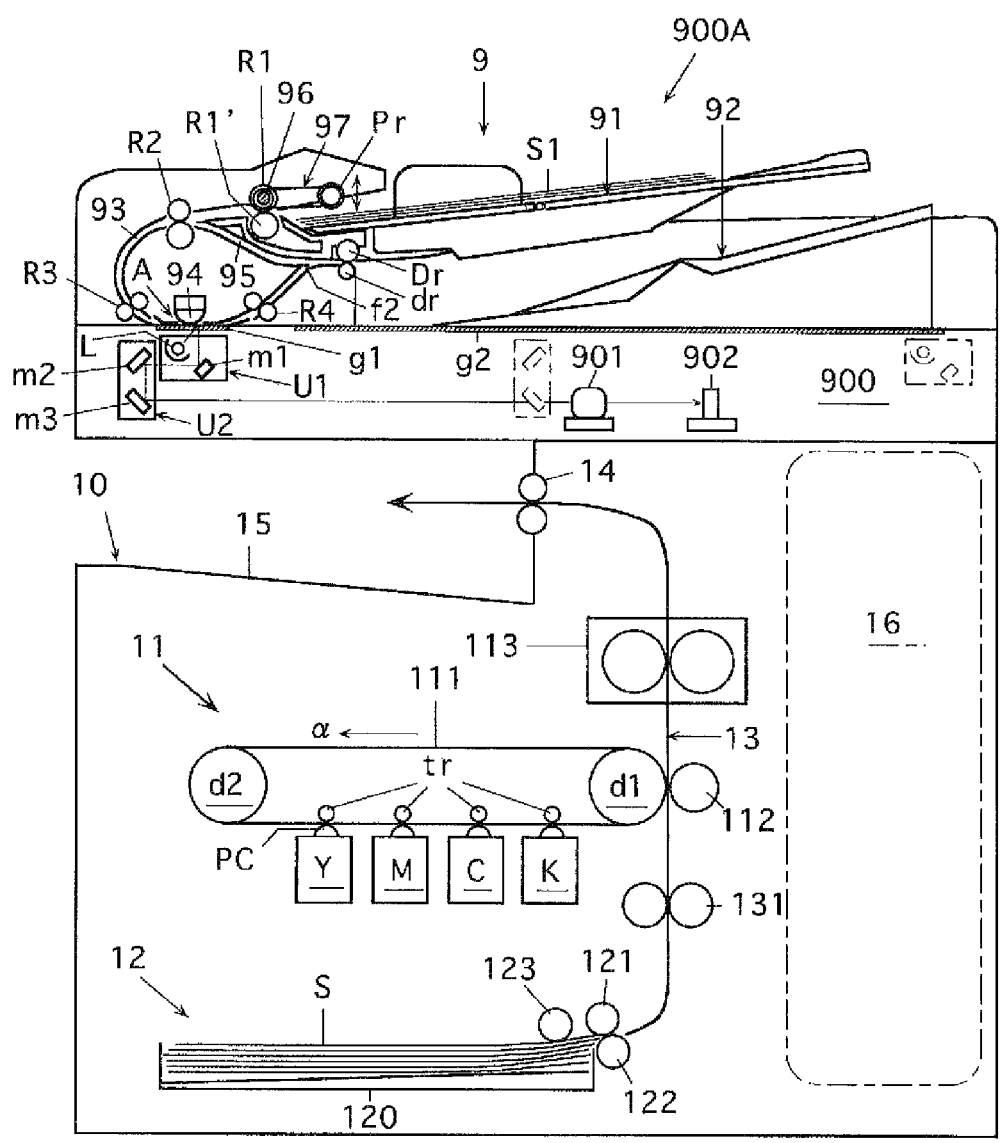
FIG. 1 shows an image forming device constructed by combining an image reading device comprising an automatic original document transfer device utilizing a sheet feeding device according to the present invention and a printer part.

The sheet feeding device of an embodiment of the present invention, automatic sheet transfer device of an embodiment of the present invention and image forming device of an embodiment of the present invention are basically as follows:
(1) Sheet Feeding Device A sheet feeding device comprising a supply roller for feeding sheets loaded on a tray for loading sheets, a drive shaft for supporting the supply roller and rotationally driving the same, a roller supporting member which is swingably supported on the drive shaft, a feed roller which is rotatably supported on the roller supporting member, a feed roller transmission mechanism for rotating the feed roller in conjunction with rotation of the supply roller and a roller supporting member transmission mechanism provided on the drive shaft for swinging the roller supporting member by the drive shaft, the feed roller being capable of, during feeding of the sheet, moving from a retracted position to be in contact with the sheets loaded on the tray to feed the top sheet to the supply roller by swinging of the roller supporting member by the drive shaft via the roller supporting member transmission mechanism, and during standby, being retracted to the retracted position by return swinging of the roller supporting member by the drive shaft via the roller supporting member transmission mechanism.

In the sheet feeding device, first and second supporting arms are employed which are swingably supported on the drive shaft as the roller supporting member, and a first transmission mechanism provided on the drive shaft for the first supporting arm and a second transmission mechanism provided on the drive shaft for the second supporting arm are employed as the roller supporting member transmission mechanism.

The feed roller is capable of being positioned in the retracted position by retainment of the first and second supporting arms by a first resilient retaining member provided for the first supporting arm and a second resilient retaining member provided for the second supporting arm, and moving from the retracted position to a feeding position where the feed roller comes into contact with the sheets mounted on the tray by swinging of the first and second supporting arms against the first and second resilient retaining members, or returning from the feeding position to the retracted position.

The first and second transmission mechanisms shift the timings that the respective first and second supporting arms are swung against the corresponding resilient retaining members at least either when the feed roller is moved from the retracted position to the feeding position or when the feed roller is returned from the feeding position to the retracted position.
(2) Automatic Sheet Transfer Device An automatic sheet transfer device which transfers sheets automatically, the automatic sheet transfer device comprising the sheet feeding device according to (1) above.

This automatic sheet transfer device can be used as, for example, an automatic original document transfer device which feeds an original document from an original document feed portion and transfers the original document to pass an image reading part.
(3) Image Forming Device An electrophotographic image forming device comprising the automatic sheet transfer device according to (2) above.

According to the above sheet feeding device, the feed roller is capable of being positioned in the retracted position by the retainment of the first and second supporting arms by a first resilient retaining member provided for the first supporting arm and a second resilient retaining member provided for the second supporting arm, and moving from the retracted position to a feeding position where the feed roller comes into contact with sheets mounted on the tray by swinging of the first and second supporting arms against the first and second resilient retaining members, or returning from the feeding position to the retracted position.

When the first and second supporting arms supporting the feed roller are swung by the drive shaft in such a manner, the first and second transmission mechanisms shift the timings that the respectively first and second supporting arms are swung against the corresponding resilient retaining members either when the feed roller is moved from the retracted position to the feeding position or when the feed roller is returned from the feeding position to the retracted position.

Therefore, either when the feed roller is moved from the retracted position to the feeding position or when the feed roller is returned from the feeding position to the retracted position, both supporting arms are prevented from receiving the resistance by the corresponding resilient retaining members simultaneously. Accordingly, a load applied when the supporting arms are moved against the resilience of the resilient retaining members, and thus when the feed roller is moved, is reduced.

Therefore, when the drive shaft is rotated by the motor via the electromagnetic clutch, and the drive shaft is disconnected from the motor by turning off the electromagnetic clutch, a load applied on the motor either when the feed roller is retracted from the sheet feeding position to the retracted position and retained in that position or when the feed roller is moved from the retracted position to the sheet feeding position can be reduced, and a load applied on the motor for moving the feed roller can be reduced as a whole.

For example, the above sheet feeding device may be constructed in the following manner: the first transmission mechanism provided on the drive shaft comprises a torque limiter which prohibits the swinging of the first supporting arm in spite of continuing rotation of the drive shaft when the first supporting arm is swung by the rotation of the drive shaft and the feed roller moves from the retracted position to the feeding position and comes into contact with the sheets on the tray, and the second transmission mechanism provided on the drive shaft comprises a torque limiter which prohibits the swinging of the second supporting arm in spite of continuing rotation of the drive shaft when the second supporting arm is swung by the rotation of the drive shaft and the feed roller moves from the retracted position to the feeding position and comes into contact with the sheets on the tray. As for the torque limiter for one of the first and second transmission mechanisms, an engaged portion for engagement with an engagement member provided on the drive shaft is formed on a drive side portion of the torque limiter which is rotationally driven by the drive shaft; the engagement member is freely fitted in the engaged portion with a play gap (backlash) in the direction of rotation of the drive shaft; and the timings that the respective first and second supporting arms are swung against the corresponding resilient retaining members are shifted by means of the play gap.

By employing this constitution, backlash is provided between one of the torque limiters and the drive shaft, and therefore the timings that the first and second supporting arms are moved can be shifted. Accordingly, either when the feed roller moves from the sheet feeding position to the standby (retracted) position, or when it moves from the standby position to the sheet feeding position, the timings that the first and second supporting arms are moved can be shifted. Therefore, the timings that the first and second supporting arms enter the corresponding resilient retaining members are shifted, and a load applied on a drive motor and the like can be lower than when both supporting arms enter the retaining members simultaneously.

Moreover, the above sheet feeding device may be constructed, for example, in the following manner.

Each of the first and second transmission mechanisms provided on the drive shaft comprises a torque limiter. The torque limiters, when the first and second supporting arms swing and the feed roller moves from the retracted position to the feeding position and comes into contact with the sheets on the tray, prohibit the swinging of the first and second supporting arms in spite of the continuing rotation of the drive shaft.

As for the torque limiters, a first engaging portion and a second engaging portion are formed on the drive shaft, a first engaged portion for engagement with the first engaging portion is formed on the first torque limiter, a second engaged portion for engagement with the second engaging portion is formed on the second torque limiter, the first engaging portion is freely fitted in the first engaged portion with a first gap (backlash) where free movement of the first engaging portion in the direction of rotation of the drive shaft is ensured, the second engaging portion is freely fitted in the second engaged portion with a second gap (backlash) where free movement of the second engaging portion in the direction opposite to that of the free movement in the first gap is ensured in the direction of rotation of the drive shaft, and the timing that the first supporting arm is swung against the first resilient retaining member and the timing that the second supporting arm is swung against the second resilient retaining member are shifted by means of the first gap and second gap.

By employing this constitution, backlash is provided between both torque limiters and the drive shaft, and therefore the timings that the first and second supporting arms are moved can be shifted. Furthermore, since the directions of backlash for both supporting arms are made opposite, when the feed roller moves from the sheet feeding position to the standby position, and when it moves from the standby position to the sheet feeding position, the timings that both supporting arms are moved can be shifted. Therefore, a load applied on the drive motor and the like can be lower than when both supporting arms enter the corresponding resilient retaining members simultaneously.

Moreover, the above sheet feeding device may be constructed, for example, in the following manner.

In movement of the feed roller from the feeding position to the retracted position, when an amount of positional shift between one of the first supporting arm and the second supporting arm whichever has moved earlier and the other supporting arm which is to move later in the direction of movement of the supporting arms is L1, and the distance that the supporting arm which has moved earlier moves further beyond the retaining position by the resilient retaining member when the supporting arm which is to move later has moved is L2, the L2 is larger than the L1.

When the condition L2>L1 is met as described above, the preceding supporting arm is moved further beyond the retracted position by an amount higher than the amount of positional shift of the retaining positions of the first and second supporting arms by the corresponding resilient retaining members, and therefore retainment of both supporting arms by the resilient retaining members can be ensured accordingly.

According to the above automatic sheet transfer device, the above sheet feeding device is employed as the sheet feed portion, and therefore a load on the drive motor and the like in feeding sheets can be reduced accordingly.

FIG. 1 shows an image forming device constructed by combining an image reading device 9 which comprises an automatic original document transfer device (an example of an automatic sheet transfer device) 900A utilizing an example of the sheet feeding device according to the present invention and a printer part 10.

The image forming device of FIG. 1 is a so-called multifunctional peripheral machine which can be used as a copying machine, printer, facsimile machine, etc.

The printer part 10 herein is, although not limited to, a system which is capable of forming a toner image by electrophotography on a recording paper sheet S based on the image information read from an original document in the image reading device 9, the image information transmitted from an external computer, a facsimile machine and the like, etc.

The printer part 10 has an image forming portion 11, a paper sheet feed portion 12 below the image forming portion, and an image formation path 13. The image forming portion 11 comprises an intermediate transfer belt 111 which is wound on a driving roller d1 and an opposing roller d2 and can be rotationally driven in a counterclockwise direction a in FIG. 1 by a belt driving portion (not shown). A yellow image formation unit Y, a magenta image formation unit M, a cyan image formation unit C and a black image formation unit K are disposed in the order stated along the belt in the direction of travel of the belt.

Each of the image formation units associated with the respective colors is capable of forming an electrostatic latent image corresponding to an image of the associated color on a photosensitive member PC by electrophotography based on the image information from the image reading device 9 and the image information transmitted from an external computer and an external facsimile machine, etc. (not shown), developing the latent image with a toner of the associated color to form a toner image, and primarily transferring this onto the belt 111 by a primary transfer roller tr to which a primary transfer bias is applied from the power source (not shown).

In forming images by using the image formation units, one of the four image formation units can be used to form a monochrome toner image, or two or more image formation units may be used to form a color image. When two or more image formation units are used, the respective color toner images formed in those image formation units are primarily transferred onto the belt 111 at the timing that they are superimposed on the belt 111.

The image forming portion 11 further comprises a secondary transfer roller 112 opposing the belt downstream of the black image formation unit K in the direction of rotation of the intermediate transfer belt 111 and a fixing device 113 thereabove.

The toner image primarily transferred onto the belt 111 as mentioned above is secondarily transferred onto the paper sheet S fed along the image formation path 13 by the secondary transfer roller 112 to which a secondary transfer bias is applied from the power source (not shown).

The paper sheet on which an image is to be formed is supplied from the paper sheet feed portion 12.

In the paper sheet feed portion 12, the paper sheets S preliminarily loaded and contained in a paper cassette 120 which is removably attached to a cassette receiving portion is drawn with the top sheet first by a pickup roller 123, this sheet is handled by a paper feed roller 121 and a handling roller 122, and fed by the paper feed roller 121 to a register roller 131 sheet by sheet.

The paper sheet fed from the paper sheet feed portion 12 is thrusted against the register roller 131 positioned at the inlet of the image formation path 13 to be paused, and transferred to the image formation path 13 by the register roller 131 at the timing that an image can be formed in a predetermined portion of the paper sheet in the image forming portion 11.

The toner image secondarily transferred onto the paper sheet in such a manner is fixed on the sheet with heating under increased pressure by the fixing device 113, and discharged into a discharge tray 15 along with the paper sheet.

As already mentioned, the image reading device 9 comprises an image reading device body 900 and an automatic original document transfer device 900A mounted thereon.

The image reading device body 900 is a device already known, and has, as shown in FIG. 1, a document table glass g1 for reading an original image by the sheet-through method and a large-area document table glass g2 for reading the original document stationarily disposed thereon. Furthermore, scanning units U1, U2, an optical system 901 including a lens and an image sensor 902 are provided below these glasses g1, g2.

The scanning unit U1 comprises an illuminating lamp L which illuminates the original document through the glasses g1 or g2 and a mirror m1 which guides the light reflected from the original document and containing image information to the unit U2. The scanning unit U2 comprises mirrors m2, m3 which deflect the light from the unit U1. The light from the mirror m3 is guided to a photoelectric image sensor (in this example, device comprising CCD) 902 via the optical system 901 comprising a plurality of lenses, and the original image forms an image in the image sensor 902 and is read.

When the original image is read by the sheet-through method using the glass g1, the scanning units U1, U2 are set stationarily in the positions shown in FIG. 1. When the original document is mounted on the glass g2 to be read, the scanning units U1, U2 are placed in a reference position for reading the same by a drive mechanism (not shown), and the two units are moved in the subscanning direction at such a speed that the speed of the unit U2 is ½ the speed of the unit U1, with the optical path length from the original document to the image sensor 902 set constant.

It should be noted that the image reading device body 900 is not limited to the constitution described above, and may be so arranged that an image reading sensor which is known itself is disposed with respect to the glass g1, or that the image reading sensor is moved at a constant speed from a predetermined position with respect to the glass g2 to read the original image.

The automatic original document transfer device 900A has an original document mounting tray 91, an original document discharge tray 92 below the original document mounting tray 91 and an original document transfer path 93 for guiding the original document from the original document mounting tray 91 via the image reading part where there is the glass g1 opposing an original document pressing portion 94 to the original document discharge tray 92.

The following rollers are sequentially disposed along the original document transfer path 93:

Original document feed roller (pickup roller) Pr for taking in the original document on the original document mounting tray 91, supply roller R1 for feeding the original document drawn and fed (picked up) by the roller Pr to the back, register roller R2 for correcting the skewing of the original document fed by the supply roller R1, pre-document reading roller R3 and post-document reading roller R4 disposed on both sides of the original document pressing portion 94, which pass the original document fed from the register roller R2 between the original document pressing portion 94 and the document table glass g1 in a original document reading portion A, and a discharge roller Dr for discharging the original document after being read into the document discharge tray 92.

The original document pressing portion 94 positions the original document which is being transferred so that the it is transferred along the document table glass g1 of the image reading device body 900 for reading the original document by sheet-through method.

The feed roller (pickup roller) Pr in the rollers for taking in the original document on the original document mounting tray 91 is a roller which is lowered to come into contact with the original document mounted on the tray 91 from above, and feeds the original document S1 on the tray 91 to the supply roller R1 in the next step.

A handling roller R1' is disposed in a manner of opposing the supply roller R1. The handling roller R1' stops when a plurality of original documents are transferred there, and the original documents are fed sheet by sheet by the rotation of the supply roller R1 during the handling roller stop period.

Rollers such as the feed roller Pr, supply roller R1 and register roller R2 can be rotationally driven so that the original document is transferred to the pre-document reading roller R3 by a roller drive mechanism comprising a motor. However, the register roller R2 starts to be rotationally driven after the front end of the original document fed by the supply roller R1 collides with the register roller R2 and the front end portion of the original document is slackened. Skewing of the original document is thus corrected.

The pre-document reading roller R3, post-document reading roller R4 and discharge roller Dr can be also simultaneously rotationally driven so that the original document is discharged into the discharge tray 92 by a roller drive mechanism comprising a motor. Moreover, the discharge roller Dr can be reversely rotated.

When the discharge roller Dr is reversely rotated, the pre-document reading roller R3 and post-document reading roller R4 are also reversely rotated. For simplification of the mechanism, the rollers R3, R4 and Dr are constituted to be simultaneously rotated forwardly or reversely.

The automatic original document transfer device 900A further includes a circulation transfer path 95 extending to the register roller R2 from a portion which is close to the discharge roller Dr and which is in the original document transfer path portion running from the post-document reading roller R4 to the discharge roller Dr.

The discharge roller Dr discharges the original document which has passed the post-document reading roller R4 into the discharge tray 92 by forward rotation, while in a mode in which images on both sides of the original document are read, the original document which has passed the post-document reading roller R4 is discharged into the discharge tray 92 with a portion of the original document undischarged and the discharge roller Dr is successively reversely rotated to switch back the original document to transfer the original document from the circulation transfer path 95 to the register roller R2.

At this time, a flexible film valve f2 is cantilevered at a portion where the original document transfer path branches into a normal portion of the original document transfer path 93 and the circulation transfer path 95 seen from the discharge roller Dr side so that the original document is smoothly switched back to the circulation transfer path 95.

The flexible film valve f2 is closed at a portion opposing the circulation transfer path 95 of the original document transfer path 93 when it does not receive an external force, and the original document which arrives from the post-document reading roller R4 can travel to the discharge roller Dr while pushing up the flexible film valve f2. The original document switched back by the reverse rotation of the discharge roller Dr can pass over the closed flexible film valve f2 and travel to the circulation transfer path 95.

In addition, the flexible film valve f1 is also provided at the outlet of the circulation transfer path 95 to the resist roller R2. The flexible film valve f1 closes the outlet of the circulation transfer path 95 when it does not receive an external force. The original document travelling from the rollers Pr and R1 to the resist roller R2 can pass the closed valve f1, and the original document travelling from the circulation transfer path 95 to the resist roller R2 can travel to the resist roller R2 while pressing down the valve f1.

The original document switched back by the reverse rotation of the discharge roller Dr and fed to the register roller R2 again is passed the image reading part A again with its front and back sides reversed, and discharged into the discharge tray 92.

At this time, after the front end of the original document with the front and back sides reversed passes the register roller R2 and before it reaches the pre-document reading roller R3, the pre-document reading roller R3 and post-document reading roller R4 are switched from reverse rotation to forward rotation. At this time, the rotation of the discharge roller Dr is also switched from reverse to forward. Therefore, when the rear end of the switched back original document has not yet come out from the discharge roller Dr, the follower roller dr driven by the rotation of the discharge roller Dr is brought away from the discharge roller Dr by a roller shifting mechanism (not shown), and brought into contact with the roller Dr again thereafter.

The above-mentioned feed roller Pr, supply roller R1 and other rollers constitute a device (sheet feeding device) which feeds sheet-like original document mounted on the tray 91. The sheet feeding device is shown in FIG. 2.

Figure 2:
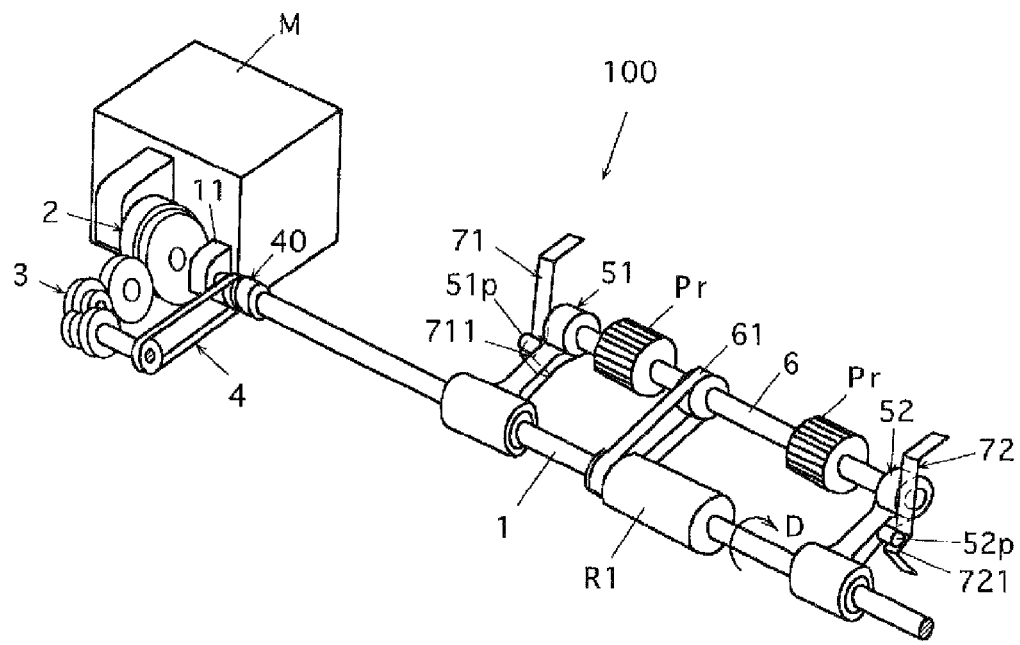
FIG. 2 is a perspective view of the sheet feeding device.

The sheet feeding device 100 shown in FIG. 2 comprises a drive shaft 1 which drives the supply roller R1. The drive shaft 1 is rotatably supported by a bearing 11 of a portion comprising a motor M mounted on the original document transfer device 900A at one end thereof, while the drive shaft 1 is rotatably supported on the original document transfer device 900A via a bearing (not shown) at the other end thereof.

The rotation of the motor M is transmitted to the drive shaft 1 via a gear transmission mechanism 3, a belt transmission mechanism 4 comprising a timing belt and a torque limiter 40 by turning on an electromagnetic clutch 2, and the transmission is discontinued by turning off the electromagnetic clutch 2. The motor M is capable of rotating forwardly and reversely. Therefore, the drive shaft 1 is also capable of rotating forwardly and reversely. The supply roller R1 can feed the original document S1 to the register roller R2 by the forward rotation D (refer also to FIG. 3).

A pair of supporting arms 51, 52 are swingably supported on the drive shaft 1. A feed roller shaft 6 is rotatably provided across the free ends of these supporting arms 51, 52, and the feed roller Pr comprising two roller portions as shown in FIG. 2 is fixedly supported on this shaft 6. A belt transmission mechanism 61 comprising a timing belt is provided across the drive shaft 1 and feed roller shaft 6, and the feed roller Pr is rotated by the rotation of the supply roller R1 by this transmission mechanism.

A pin 51p is projecting from an outer side face of the supporting arm 51. The pin 51p is capable of engaging a resilient retaining member 71 provided on the main body side of the original document transfer device by the swinging of the supporting arm 51 by the rotation of the drive shaft 1, and disengaging downwardly from that state. A pin 52p is projecting from an outer side face of the other supporting arm 52. The pin 52p is capable of engaging a resilient retaining member 72 provided on the main body side of the original document transfer device by the swinging of the supporting arm 52 by the rotation of the drive shaft 1, and disengaging downwardly from that state. The resilient retaining members 71, 72 are bent plate springs in this example.

Figure 4A:
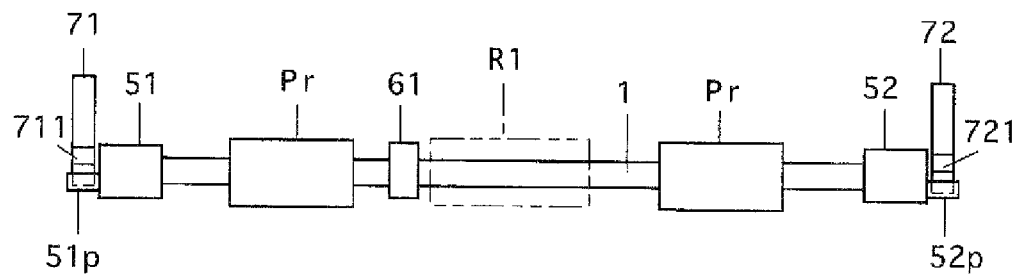
FIG. 4(A) to FIG. 4(C) show a shift in the timings for operating supporting arms which are supporting a feed roller shaft when the feed roller is retracted to a retracted position.
Figure 4B:
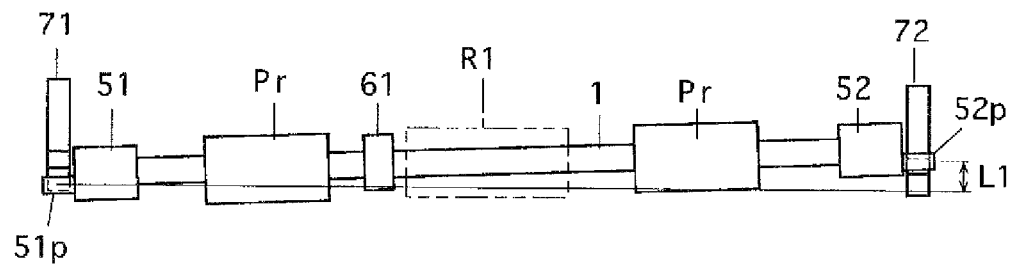
Figure 4C:
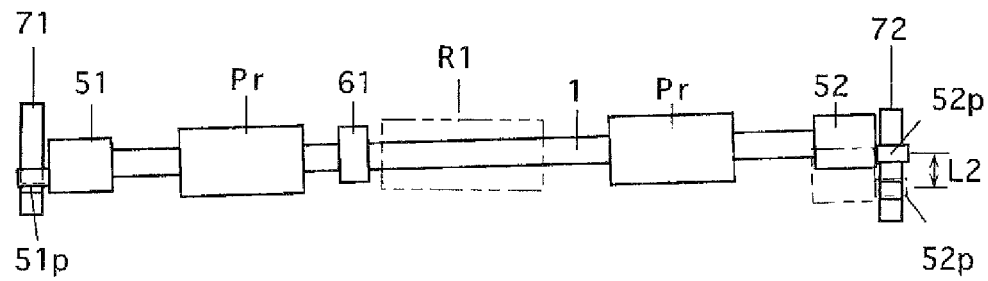

As shown in FIGS. 4(A), 4(B) and 4(C), when the supporting arms 51, 52 swing upwardly and the pins 51p, 52p push away and pass over bent protrusions 711, 721 bending and protruding to the drive shaft 1 side of the retaining members 71, 72 against the resilience of the retaining members, bent protrusions 711, 721 are resiliently returned. In such a manner, the supporting arms 51, 52, and thus the feed roller Pr, are placed in retracted positions spaced away from the original document S1 on the tray 91.

During standby, i.e., when the original document (sheet) is not fed, the feed roller Pr can be placed in the retracted position in such a manner by reversely rotating the drive shaft 1 in the direction C (refer to FIG. 3), and the electromagnetic clutch 2 is then turned off. Even when the electromagnetic clutch 2 is turned off, the pins 51p, 52p are supported by the bent protrusions 711, 721 of the retaining members 71, 72, whereby the feed roller Pr is prevented from falling on the sheet S1.

When switching from such a standby state to an original document (sheet) feeding state, the motor M is forwardly rotated and the electromagnetic clutch 2 is turned on, whereby the drive shaft 1 is forwardly rotated in the direction D, and the supporting arms 51, 52 are swung downwardly. When the pins 51p, 52p push away and pass under the bent protruding protrusions 711, 721 of the retaining members 71, 72 against the resilience of the retaining members, the bent protrusions 711, 721 are returned by resilience. The feed roller Pr is thus placed in a sheet feeding position where it is in contact with the original document S1 on the tray 91.

Figure 3:
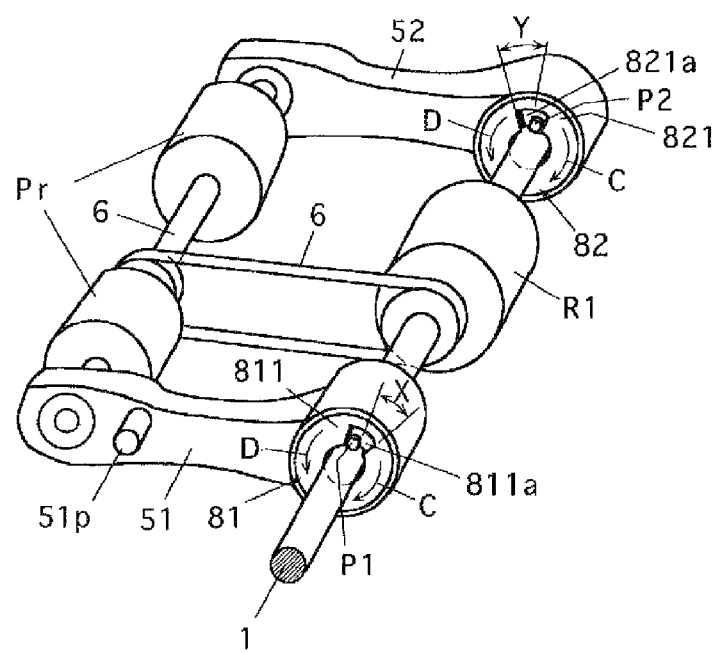
FIG. 3 is a perspective view of a key part of the sheet feeding device seen from the motor side.

As shown in FIG. 3, a torque limiter 81 is provided between the supporting arm 51 and drive shaft 1 as a first transmission mechanism, and a torque limiter 82 is provided between the supporting arm 52 and drive shaft 1 as a second transmission mechanism.

These torque limiters 81, 82, when the first and second supporting arms 51, 52 are swung so that the feed roller Pr is moved from the retracted position to the feeding position and comes into contact with the sheet original document on the tray 91, prohibits further swinging of the first and second supporting arms 51, 52 in spite of the continuing rotation of the drive shaft 1, thereby preventing breakage of the arms.

As shown in FIG. 3, an engaged portion 811a for engaging with an engagement pin P1 upstanding on the drive shaft 1 is formed in a portion 811 of the torque limiter 81 which is to be driven by the drive shaft 1. When the drive shaft 1 is rotated and the pin P1 engages this engaged portion 811a, the supporting arm 51 is swung. What is noteworthy here, however, is that the pin P1 is freely fitted in the engaged portion 811a with a play gap (backlash) X in the direction of rotation of the drive shaft 1.

In addition, as shown in FIG. 3, in a portion 821 of the other torque limiter 82 which is to be driven by the drive shaft 1, an engaged portion 821a for engagement with an engagement pin P2 (pin which is parallel to the pin P1) upstanding on the drive shaft 1 is formed. When the drive shaft 1 is rotated and the pin P2 engages this engaged portion 821a, the supporting arm 52 is swung. What is noteworthy here is that the pin P2 is freely fitted in the engaged portion 821a with a play gap (backlash) Y in the direction of rotation of the drive shaft 1.

The play gaps (backlash) X and Y are formed to provide plays (backlash) in the directions opposite to each other in the direction of rotation of the drive shaft 1.

In the example shown in FIG. 3, when the drive shaft 1 is reversely rotated in the direction C from the state that the feed roller Pr is in the sheet feeding position, first, the pin P2 engages the engaged portion 821a in the torque limiter 82 on the supporting arm 52 side and the supporting arm 52 starts to swing upwardly, and then the pin P1 in the torque limiter 81 on the supporting arm 51 side engages the engaged portion 811a and the supporting arm 51 starts to swing upwardly.

Therefore, first, the pin 52p on the side face of the supporting arm 52 pushes away the resilient retaining member 72 formed of the plate spring against the resilience and elevates, and passes over the bent protrusion 721. The pin 51p on the side face of the supporting arm 51 then pushes away the resilient retaining member 71 formed of the plate spring against the resilience of the same and elevates, and passes over the bent protrusion 711.

The feed roller Pr can be thus positioned in the retracted position. Thereafter, the electromagnetic clutch 2 is turned off. If the supporting arms 51, 52 further elevate and come into contact with anything, the torque limiter 40 operates so that damages to the arms 51, 52, etc., are prevented.

As mentioned, when the feed roller Pr elevates from the feeding position to the retracted position, the supporting arms 51, 52 do not simultaneously elevate against the resilience of the resilient retaining members 71, 72, but each of the arms 51, 52 passes over the bent protrusion of the corresponding resilient retaining member one by one. Therefore, a load applied on the drive motor M and the like is reduced accordingly.

Moreover, in a transition from such a state as shown in FIG. 4(A) that the pins 51p, 52p of the supporting arms 51, 52 have not both passed over the bent protrusions 711, 721 of the resilient retaining members 71, 72, to such a state as shown in FIG. 4(B) that only the pin 52p of one (arm 52) of the supporting arms 51,52 has passed over the bent protrusion 721 of the corresponding resilient retaining member 72 first, an amount of positional shift of the supporting arms 51, 52 in the direction of elevation and swinging of the supporting arms is L1.

By further rotation of the drive shaft 1, as shown in FIG. 4(C), the pin 51p of the supporting arm 51 also passes over the bent protrusion 711 of the corresponding resilient retaining member 71, whereby the supporting arm 52 which has elevated earlier further elevates by L2. Herein, a relationship of L1<L2 is set between the L1 and L2.

When the relationship L1<L2 is met, the supporting arm 52 on the preceding side is moved beyond the retracted position by an amount higher than the amount of positional shift L1 in the retaining positions by the corresponding resilient retaining members 71, 72 of the supporting arms 51, 52, and retainment of both supporting arms 51, 52 by the resilient retaining members 71, 72 can be ensured accordingly.

When the drive shaft 1 is forwardly rotated in the direction D from the state that the feed roller Pr is in the retracted position, first, the pin P1 in the torque limiter 81 on the supporting arm 51 side engages the engaged portion 811a and the supporting arm 51 starts to swing and lower, the pin P2 then engages the engaged portion 821a in the torque limiter 82 on the supporting arm 52 side, and the supporting arm 52 starts to swing and lower.

Therefore, the pin 51p on the side face of the supporting arm 51 pushes away the resilient retaining member 71 formed of the plate spring against the resilience of the same and lower first, and passes under the bent protrusion 711. Thereafter, the pin 52p on the side face of the supporting arm 52 pushes away the resilient retaining member 72 formed of the plate spring against the resilience and lower, and passes under the bent protrusion 721.

The feed roller Pr can be thus lowered to the sheet feeding position. Even if the supporting arms 51, 52 are further lowered in a state that the feed roller Pr is in contact with the original document sheet S1 on the tray 91, they are prohibited from lowering by the torque limiters 81, 82, thereby preventing damages to the supporting arms and the like.

As described above, when the feed roller Pr is lowered from the retracted position to the feeding position, the supporting arms 51, 52 are not lowered simultaneously against the resilience of the resilient retaining members 71, 72, but each of the arms 51, 52 passes over the bent protrusion of the corresponding resilient retaining member one by one, and therefore a load applied on the drive motor M and the like is reduced accordingly.

In the example described above, backlash is provided for both torque limiters 81, 82, but it may be formed for either one of them, whereby a load applied on the motor M and the like when the feed roller is retracted to the retracted position, or when it is lowered from the retracted position to the sheet feeding position can be reduced accordingly.

Since the automatic original document transfer device 900A employs such a sheet feeding device 100 as an original document feed portion, it can reduce a load on the drive motor and the like accordingly.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sheet feeding device comprising:
   a supply roller for feeding sheets loaded on a tray for loading sheets,
   a drive shaft for supporting the supply roller and rotationally driving the same,
   a first supporting arm which is swingably supported on the drive shaft,
   a second supporting arm which is swingably supported on the drive shaft,
   a feed roller which is rotatably supported on the first supporting arm and second supporting arm,
   a feed roller transmission mechanism for rotating the feed roller in conjunction with rotation of the supply roller,
   a first transmission mechanism for swinging the first supporting arm,
   a second transmission mechanism for swinging the second supporting arm,
   a first resilient retaining member which is capable of retaining the first supporting arm, and
   a second resilient retaining member which is capable of retaining the second supporting arm,
   the feed roller
   being capable of being positioned in a retracted position where the first supporting arm is retained by the first resilient retaining member, and the second supporting arm is retained by the second resilient member,
   during feeding of the sheet, moving from the retracted position to a feeding position where it comes into contact with the sheets mounted on the tray by swinging of the first supporting arm against the first resilient retaining member by the drive shaft via the first transmission mechanism and by swinging of the second supporting arm against the second resilient retaining member by the drive shaft via the second transmission mechanism, and feeding the sheets to the supply roller with the top sheet first,
   when retracted, moving from the feeding position to the retracted position by swinging of the first supporting arm against the first resilient retaining member by the drive shaft via the first transmission mechanism and by swinging of the second supporting arm against the second resilient retaining member by the drive shaft via the second transmission mechanism,
   the first transmission mechanism and the second transmission mechanism
   shifting the timing that the first supporting arm is swung against the first resilient retaining member and the timing that the second supporting arm is swung against the second resilient retaining member either when the feed roller is moved from the retracted position to the feeding position or when the feed roller is moved from the feeding position to the retracted position.

2. The sheet feeding device according to claim 1, wherein the sheet feeding device comprises a first torque limiter which is provided in the first transmission mechanism and prohibits the first supporting arm from swinging in spite of continuing rotation of the drive shaft when the first supporting arm swings by the rotation of the drive shaft and the feed roller moves from the retracted position to the feeding position and comes into contact with the sheets on the tray, and
   a second torque limiter which is provided in the second transmission mechanism and prohibits the second supporting arm from swinging in spite of continuing rotation of the drive shaft when the second supporting arm swings by the rotation of the drive shaft and the feed roller moves from the retracted position to the feeding position and comes into contact with the sheets on the tray, wherein
   an engaging portion is formed on the drive shaft,
   an engaged portion for engagement with the engaging portion is formed on either the first torque limiter or the second torque limiter,
   the engaging portion is freely fitted in the engaged portion with a gap where free movement in direction of rotation of the drive shaft is ensured, and the timing that the first supporting arm is swung against the first resilient retaining member and the timing that the second supporting arm is swung against the second resilient retaining member are shifted by means of the gap.

3. The sheet feeding device according to claim 1, wherein the sheet feeding device comprises a first torque limiter which is provided in the first transmission mechanism and prohibits the first supporting arm from swinging in spite of continuing rotation of the drive shaft when the first supporting arm swings by the rotation of the drive shaft and the feed roller moves from the retracted position to the feeding position and comes into contact with the sheets on the tray, and
   a second torque limiter which is provided in the second transmission mechanism and prohibits the second supporting arm from swinging in spite of continuing rotation of the drive shaft when the second supporting arm swings by the rotation of the drive shaft and the feed roller moves from the retracted position to the feeding position and comes into contact with the sheets on the tray, wherein
   a first engaging portion and a second engaging portion are formed on the drive shaft,
   a first engaged portion for engagement with the first engaging portion is formed on the first torque limiter,
   a second engaged portion for engagement with the second engaging portion is formed on the second torque limiter,
   the first engaging portion is freely fitted in the first engaged portion with a first gap where free movement of the first engaging portion in the direction of rotation of the drive shaft is ensured,
   the second engaging portion is freely fitted in the second engaged portion with a second gap where free movement of the second engaging portion in the direction opposite to that of the free movement in the first gap is ensured in the direction of rotation of the drive shaft, and
   the timing that the first supporting arm is swung against the first resilient retaining member and the timing that the second supporting arm is swung against the second resilient retaining member are shifted by means of the first gap and second gap.

4. The sheet feeding device according to claim 1, wherein in movement of the feed roller from the feeding position to the retracted position,
   when an amount of positional shift between one of the first supporting arm and the second supporting arm whichever has moved earlier and the other supporting arm which is to move later in the direction of movement of the supporting arms is L1, and the distance that the supporting arm which has moved earlier moves further beyond the retaining position by the resilient retaining member when the supporting arm which is to move later has moved is L2, the L2 is larger than the L1.

5. An automatic sheet transfer device which transfers sheets automatically, the automatic sheet transfer device comprising the sheet feeding device according to claim 1.

6. The automatic sheet transfer device according to claim 5, wherein the sheet feeding device comprises a first torque limiter which is provided in the first transmission mechanism and prohibits the first supporting arm from swinging in spite of continuing rotation of the drive shaft when the first supporting arm swings by the rotation of the drive shaft and the feed roller moves from the retracted position to the feeding position and comes into contact with the sheets on the tray, and a second torque limiter which is provided in the second transmission mechanism and prohibits the second supporting arm from swinging in spite of continuing rotation of the drive shaft when the second supporting arm swings by the rotation of the drive shaft and the feed roller moves from the retracted position to the feeding position and comes into contact with the sheets on the tray, wherein an engaging portion is formed on the drive shaft, an engaged portion for engagement with the engaging portion is formed on either the first torque limiter or the second torque limiter, the engaging portion is freely fitted in the engaged portion with a gap where free movement in direction of rotation of the drive shaft is ensured, and the timing that the first supporting arm is swung against the first resilient retaining member and the timing that the second supporting arm is swung against the second resilient retaining member are shifted by means of the gap.

7. The automatic sheet transfer device according to claim 5, wherein the sheet feeding device comprises a first torque limiter which is provided in the first transmission mechanism and prohibits the first supporting arm from swinging in spite of continuing rotation of the drive shaft when the first supporting arm swings by the rotation of the drive shaft and the feed roller moves from the retracted position to the feeding position and comes into contact with the sheets on the tray, and a second torque limiter which is provided in the second transmission mechanism and prohibits the second supporting arm from swinging in spite of continuing rotation of the drive shaft when the second supporting arm swings by the rotation of the drive shaft and the feed roller moves from the retracted position to the feeding position and comes into contact with the sheets on the tray, wherein a first engaging portion and a second engaging portion are formed on the drive shaft, a first engaged portion for engagement with the first engaging portion is formed on the first torque limiter, a second engaged portion for engagement with the second engaging portion is formed on the second torque limiter, the first engaging portion is freely fitted in the first engaged portion with a first gap where free movement of the first engaging portion in the direction of rotation of the drive shaft is ensured, the second engaging portion is freely fitted in the second engaged portion with a second gap where free movement of the second engaging portion in the direction opposite to that of the free movement in the first gap is ensured in the direction of rotation of the drive shaft, and the timing that the first supporting arm is swung against the first resilient retaining member and the timing that the second supporting arm is swung against the second resilient retaining member are shifted by means of the first gap and second gap.

8. The automatic sheet transfer device according to claim 5, wherein in the movement of the feed roller from the feeding position to the retracted position in the sheet feeding device, when an amount of positional shift between one of the first supporting arm and the second supporting arm whichever has moved earlier and the other supporting arm which is to move later in the direction of movement of the supporting arms is L1, and the distance that the supporting arm which has moved earlier moves further beyond the retaining position by the resilient retaining member when the supporting arm which is to move later has moved is L2, the L2 is larger than the L1.

9. An electrophotographic image forming device comprising the automatic sheet transfer device according to claim 5.

10. The image forming device according to claim 9, wherein the sheet feeding device comprises a first torque limiter which is provided in the first transmission mechanism and prohibits the first supporting arm from swinging in spite of continuing rotation of the drive shaft when the first supporting arm swings by the rotation of the drive shaft and the feed roller moves from the retracted position to the feeding position and comes into contact with the sheets on the tray, and a second torque limiter which is provided in the second transmission mechanism and prohibits the second supporting arm from swinging in spite of continuing rotation of the drive shaft when the second supporting arm swings by the rotation of the drive shaft and the feed roller moves from the retracted position to the feeding position and comes into contact with the sheets on the tray, wherein an engaging portion is formed on the drive shaft, an engaged portion for engagement with the engaging portion is formed on either the first torque limiter or the second torque limiter, the engaging portion is freely fitted in the engaged portion with a gap where free movement in direction of rotation of the drive shaft is ensured, and the timing that the first supporting arm is swung against the first resilient retaining member and the timing that the second supporting arm is swung against the second resilient retaining member are shifted by means of the gap.

11. The image forming device according to claim 9, wherein the sheet feeding device comprises a first torque limiter which is provided in the first transmission mechanism and prohibits the first supporting arm from swinging in spite of continuing rotation of the drive shaft when the first supporting arm swings by the rotation of the drive shaft and the feed roller moves from the retracted position to the feeding position and comes into contact with the sheets on the tray, and a second torque limiter which is provided in the second transmission mechanism and prohibits the second supporting arm from swinging in spite of continuing rotation of the drive shaft when the second supporting arm swings by the rotation of the drive shaft and the feed roller moves from the retracted position to the feeding position and comes into contact with the sheets on the tray, wherein a first engaging portion and a second engaging portion are formed on the drive shaft, a first engaged portion for engagement with the first engaging portion is formed on the first torque limiter, a second engaged portion for engagement with the second engaging portion is formed on the second torque limiter, the first engaging portion is freely fitted in the first engaged portion with a first gap where free movement of the first engaging portion in the direction of rotation of the drive shaft is ensured, the second engaging portion is freely fitted in the second engaged portion with a second gap where free movement of the second engaging portion in the direction opposite to that of the free movement in the first gap is ensured in the direction of rotation of the drive shaft, and the timing that the first supporting arm is swung against the first resilient retaining member and the timing that the second supporting arm is swung against the second resilient retaining member are shifted by means of the first gap and second gap.

12. The image forming device according to claim 9, wherein in the movement of the feed roller from the feeding position to the retracted position in the sheet feeding device, when an amount of positional shift between one of the first supporting arm and the second supporting arm whichever has moved earlier and the other supporting arm which is to move later in the direction of movement of the supporting arms is L1, and the distance that the supporting arm which has moved earlier moves further beyond the retaining position by the resilient retaining member when the supporting arm which is to move later has moved is L2, the L2 is larger than the L1.

* * * * *